(12) United States Patent
Abdelhamid et al.

(10) Patent No.: US 11,452,304 B1
(45) Date of Patent: Sep. 27, 2022

(54) BEVERAGE COMPOSITIONS HAVING ENHANCED STABILITY

(71) Applicant: Altru Brands, LLC, Dayton, NJ (US)

(72) Inventors: Haissam Abdelhamid, Dayton, NJ (US); Eugene G. Gross, II, Ewing, NJ (US)

(73) Assignee: ALTRU BRANDS, LLC, Dayton, NJ (US)

( * ) Notice: Subject to any disclaimer, the term of this patent is extended or adjusted under 35 U.S.C. 154(b) by 10 days.

(21) Appl. No.: 16/706,566

(22) Filed: Dec. 6, 2019

Related U.S. Application Data

(60) Provisional application No. 62/776,606, filed on Dec. 7, 2018.

(51) Int. Cl.
| | |
|---|---|
| *A23L 2/42* | (2006.01) |
| *A23L 2/02* | (2006.01) |
| *A23L 2/68* | (2006.01) |
| *A23L 2/60* | (2006.01) |
| *A23L 2/58* | (2006.01) |
| *A23L 33/16* | (2016.01) |
| *A23L 33/105* | (2016.01) |
| *A23L 2/56* | (2006.01) |

(52) U.S. Cl.
CPC ............... *A23L 2/42* (2013.01); *A23L 2/02* (2013.01); *A23L 2/56* (2013.01); *A23L 2/58* (2013.01); *A23L 2/60* (2013.01); *A23L 2/68* (2013.01); *A23L 33/105* (2016.08); *A23L 33/16* (2016.08); *A23V 2002/00* (2013.01)

(58) Field of Classification Search
CPC ... A23L 2/42; A23L 33/16; A23L 2/02; A23L 2/56; A23L 2/58; A23L 2/60; A23L 2/68; A23V 2002/00
USPC .................................. 426/72, 590, 599, 597
See application file for complete search history.

(56) References Cited

FOREIGN PATENT DOCUMENTS

CN 105176741 * 12/2015

OTHER PUBLICATIONS

Korir, M. W. et al. "The fortification of tea with sweeteners and milk and its effect on in vitro antioxidant potential of tea product and glutathione levels", Food Chemistry, vol. 145, pp. 145-153. (Year: 2014).*

* cited by examiner

*Primary Examiner* — Helen F Heggestad
(74) *Attorney, Agent, or Firm* — Gearhart Law LLC

(57) ABSTRACT

Beverage compositions having enhanced shelf life are disclosed that contain juice-based compositions, vegetable extracts, ascorbic acid and glutathione. Glutathione at a pH of 4 or less is shown to inhibit browning and color degradation of the beverages without imparting a bad smell and taste that is usually associated with compositions with elevated amounts of glutathione.

20 Claims, 12 Drawing Sheets

| Flavor | Ascorbic Acid | Glutathione | Citric Acid | Refridgerated Sample | Oven Sample |
|---|---|---|---|---|---|
| Mangosteen Peach | 0 | 0 | 600 | 5 | 4.2 |
| Mangosteen Peach | 5 | 0 | 600 | 5 | 3.8 |
| Mangosteen Peach | 15 | 0 | 600 | 5 | 3.6 |
| Mangosteen Peach | 30 | 0 | 600 | 5 | 3.2 |
| Mangosteen Peach | 0 | 10 | 600 | 5 | 4.3 |
| Mangosteen Peach | 5 | 10 | 600 | 5 | 4 |
| Mangosteen Peach | 15 | 10 | 600 | 5 | 3.7 |
| Mangosteen Peach | 30 | 10 | 600 | 5 | 3.7 |
| Mangosteen Peach | 30 | 0 | 1000 | 5 | 3.2 |
| Mangosteen Peach | 30 | 10 | 1000 | 5 | 3.5 |

| Oven Sample | Description |
|---|---|
| 4.2 | Overall color is fading slightly in the product (typical to what we see in naturally positioned products) |
| 3.8 | Overall color is fading in the product |
| 3.6 | Color is fading and color is browning |
| 3.2 | Color is fading and color is browning (bordering on unaccepatable) |
| 4.3 | Overall color is fading slightly in the product (typical to what we see in naturally positioned products) |
| 4 | Overall color is fading slightly in the product (typical to what we see in naturally positioned products) |
| 3.7 | Color is fading and color is browning |
| 3.7 | color is fading and color is borwing |
| 3.2 | Product is browing |
| 3.5 | Product is browing |

FIGURE 1B

| Flavor | Ascorbic Acid | Glutathione | Citric Acid | Refrigerated Sample | Oven Sample |
|---|---|---|---|---|---|
| Mangosteen Peach | 0 | 0 | 600 | 5 | 4.2 |
| Mangosteen Peach | 5 | 0 | 600 | 5 | 3.8 |
| Mangosteen Peach | 15 | 0 | 600 | 5 | 3.6 |
| Mangosteen Peach | 30 | 0 | 600 | 5 | 3.2 |
| Mangosteen Peach | 0 | 10 | 600 | 5 | 4.3 |
| Mangosteen Peach | 5 | 10 | 600 | 5 | 4 |
| Mangosteen Peach | 15 | 10 | 600 | 5 | 3.7 |
| Mangosteen Peach | 30 | 10 | 600 | 5 | 3.7 |
| Mangosteen Peach | 30 | 0 | 1000 | 5 | 3.2 |
| Mangosteen Peach | 30 | 10 | 1000 | 5 | 3.5 |

| Oven Sample | Comments |
|---|---|
| 4.2 | Overall color is fading slightly in the product (typical to what we see in naturally positioned products) |
| 3.8 | Overall color is fading in the product |
| 3.6 | Color is fading and color is browning |
| 3.2 | Color is fading and color is browning (bordering on unacceptable) |
| 4.3 | Overall color is fading slightly in the product (typical to what we see in naturally positioned products) |
| 4 | Overall color is fading slightly in the product (typical to what we see in naturally positioned products) |
| 3.7 | Color is fading and color is browning |
| 3.7 | Color is fading and color is browning |
| 3.2 | Product is browning |
| 3.5 | Product is browning |

FIGURE 1D

PEACH MANGOSTEEN FLAVORED BEVERAGE WITH A NATURAL COLORANT FROM FRUIT AND/OR VEGETABLE EXTRACTS

|  |  | Sample # | | | | | | | | | |
|---|---|---|---|---|---|---|---|---|---|---|---|
|  |  | 1 | 2 | 3 | 4 | 5 | 6 | 7 | 8 | 9 | 10 |
| Peach Mangosteen | % |  |  |  |  |  |  |  |  |  |  |
|  | gms |  |  |  |  |  |  |  |  |  |  |
| L-Glutathione |  | 0 | 0 | 0 | 0 | 0.005 | 0.005 | 0.005 | 0.01 | 0.01 | 0.025 |
| Ascorbic Acid |  | 0 | 0.003 | 0.006 | 0.012 | 0 | 0.001 | 0.003 | 0.006 | 0.012 | 0.012 |

FIGURE 2A

MANGO CHERIMOYA FLAVORED BEVERAGE WITH A NATURAL COLORANT FROM FRUIT AND/OR VEGETABLE EXTRACTS

| | | Sample # | | | | | | | | | |
|---|---|---|---|---|---|---|---|---|---|---|---|
| | | 1 | 2 | 3 | 4 | 5 | 6 | 7 | 8 | 9 | 10 |
| Mango Cherimoya | % | | | | | | | | | | |
| | gms | | | | | | | | | | |
| L-Glutathione | | 0 | 0 | 0 | 0 | 0.005 | 0.005 | 0.005 | 0.01 | 0.01 | 0.025 |
| Ascorbic Acid | | 0 | 0.003 | 0.006 | 0.012 | 0 | 0.001 | 0.003 | 0.006 | 0.012 | 0.012 |

FIGURE 2B

MANGO CHERIMOYA FLAVOREID BEVERAGE WITHOUT A NATURAL COLORANT FROM FRUIT AND/OR VEGETABLE EXTRACTS

| | | Sample # | | | | | | | | |
|---|---|---|---|---|---|---|---|---|---|---|
| | | 1 | 2 | 3 | 4 | 5 | 6 | 7 | 8 | 9 |
| Mango Cherimoya - W/O Color Added | % | | | | | | | | | |
| | gms | 0 | 0 | 0 | 0 | 0.005 | 0.005 | 0.005 | 0.01 | 0.01 |
| L-Glutathione | | 0 | 0 | 0 | 0 | 0.005 | 0.005 | 0.005 | 0.01 | 0.01 |
| Ascorbic Acid | | 0 | 0.003 | 0.006 | 0.012 | 0 | 0.001 | 0.003 | 0.006 | 0.012 |

FIGURE 2C

| Per 16 Ounces | | | |
|---|---|---|---|
| SKU to Test | Ascorbic Acid (mg) | Glutathione (mg) | Sample # |
| Peach Mangosteen | 0 | 0 | 1 |
| Mango Cherimoya | 15 | 0 | 2 |
| | 30 | 0 | 3 |
| | 60 | 0 | 4 |
| | 0 | 25 | 5 |
| | 5 | 25 | 6 |
| | 15 | 25 | 7 |
| | 30 | 50 | 8 |
| | 60 | 50 | 9 |
| | 60 | 125 | 10 |

| SAMPLES (/16 ounces) | Concentration | |
|---|---|---|
| 25mg of GSH in 473 mL | 0.000172M | 172 μM |
| 50mg of GSH in 473 mL | 0.000344M | 344 μM |
| 125mg of GSH in 473 mL | 0.000860M | 860 μM |
| 5mg of Ascorbic Acid in 473 mL | 0.00006M | 60μM |
| 15mg of Ascorbic Acid in 473 mL | 0.00018M | 180μM |
| 30mg of Ascorbic Acid in 473 mL | 0.00036M | 360μM |
| 60mg of Ascorbic Acid in 473 mL | 0.00072M | 720μM |

FIGURE 2D

| Week 3 | | | PM |
|---|---|---|---|
| Conc | ABS | Sample # | |
| GSH 0 | AA 0 | 0.259 | 1 | |
| GSH 0 | AA 15 | 0.208 | 2 | |
| GSH 0 | AA 30 | 0.218 | 3 | |
| GSH 0 | AA 60 | 0.283 | 4 | |
| GSH 25 | AA 0 | 0.166 | 5 | |
| GSH 25 | AA 5 | 0.174 | 6 | |
| GSH 25 | AA 15 | 0.182 | 7 | |
| GSH 50 | AA 30 | 0.205 | 8 | |
| GSH 50 | AA 60 | 0.238 | 9 | |
| GSH 125 | AA 60 | 0.202 | 10 | |

| Week 3 | | | MC |
|---|---|---|---|
| Conc | ABS | Sample # | |
| GSH 0 | AA 0 | 0.137 | 1 | |
| GSH 0 | AA 15 | 0.139 | 2 | |
| GSH 0 | AA 30 | 0.167 | 3 | |
| GSH 0 | AA 60 | 0.22 | 4 | |
| GSH 25 | AA 0 | 0.118 | 5 | |
| GSH 25 | AA 5 | 0.117 | 6 | |
| GSH 25 | AA 15 | 0.135 | 7 | |
| GSH 50 | AA 30 | 0.145 | 8 | |
| GSH 50 | AA 60 | 0.182 | 9 | |
| GSH 125 | AA 60 | 0.154 | 10 | |

| Week 3 | | | |
|---|---|---|---|
| Conc | ABS | Sample # | |
| GSH 0 \| AA 0 | 0.367 | 1 | |
| GSH 0 \| AA 15 | 0.315 | 2 | |
| GSH 0 \| AA 30 | 0.325 | 3 | |
| GSH 0 \| AA 60 | 0.341 | 4 | |
| GSH 25 \| AA 0 | 0.271 | 5 | |
| GSH 25 \| AA 5 | 0.289 | 6 | |
| GSH 25 \| AA 15 | 0.309 | 7 | |
| GSH 50 \| AA 30 | 0.309 | 8 | |
| GSH 50 \| AA 60 | 0.363 | 9 | |
| GSH 125 \| AA 60 | 0.405 | 10 | |

| GROUP 1 | Subject # | Taste (1-5) | Smell (1-5) | | GROUP 1A | Subject # | Taste (1-5) | Smell (1-5) |
|---|---|---|---|---|---|---|---|---|
| | 1 | 2 | 1 | | | 1 | 1 | 1 |
| | 2 | 2 | 3 | | | 2 | 1 | 1 |
| | 3 | 2 | 1 | | | 3 | 1 | 1 |
| | 4 | 2 | 2 | | | 4 | 1 | 1 |
| | 5 | 3 | 2 | | | 5 | 1 | 1 |
| | 6 | 2 | 2 | | | 6 | 1 | 1 |
| | | 2.17 AVG | 1.50 AVG | | | | 1.00 AVG | 1.00 AVG |

| GROUP 2 | Subject # | Taste (1-5) | Smell (1-5) | | GROUP 2A | Subject # | Taste (1-5) | Smell (1-5) |
|---|---|---|---|---|---|---|---|---|
| | 1 | 3 | 2 | | | 1 | 2 | 1 |
| | 2 | 3 | 1 | | | 2 | 1 | 1 |
| | 3 | 3 | 2 | | | 3 | 2 | 1 |
| | 4 | 2 | 2 | | | 4 | 1 | 1 |
| | 5 | 4 | 2 | | | 5 | 1 | 1 |
| | 6 | 3 | 1 | | | 6 | 1 | 1 |
| | | 3.00 AVG | 1.67 AVG | | | | 1.33 AVG | 1.00 AVG |

| GROUP 3 | Subject # | Taste (1-5) | Smell (1-5) | | GROUP 3A | Subject # | Taste (1-5) | Smell (1-5) |
|---|---|---|---|---|---|---|---|---|
| | 1 | 4 | 3 | | | 1 | 2 | 2 |
| | 2 | 4 | 3 | | | 2 | 2 | 1 |
| | 3 | 5 | 2 | | | 3 | 3 | 2 |
| | 4 | 4 | 3 | | | 4 | 2 | 2 |
| | 5 | 5 | 4 | | | 5 | 3 | 1 |
| | 6 | 4 | 3 | | | 6 | 2 | 1 |
| | | 4.33 AVG | 3.00 AVG | | | | 2.33 AVG | 1.50 AVG |

FIGURE 6

BEVERAGE COMPOSITIONS HAVING ENHANCED STABILITY

CROSS-REFERENCE TO RELATED APPLICATIONS

This application claims priority to Provisional Patent Application Nos. 62/776,606, filed on Dec. 7, 2018, the content of which is incorporated by reference herein in its entirety.

FIELD OF THE EMBODIMENTS

The present invention relates generally to beverage compositions having enhanced stability.

BACKGROUND OF THE EMBODIMENTS

Beverage compositions can contain fruit juice, fruit powder, fruit extracts, vegetable extracts or combinations thereof. These beverage compositions, however, are subject to browning and color degradation over time, which shortens their shelf life. The addition of ascorbic acid to these beverage compositions further shortens their shelf life because ascorbic acid accelerates the browning and color degradation processes. Glutathione can counter these processes, but the high concentrations of glutathione reportedly required to inhibit or prevent browning and color degradation invariably results in a bad smell, like rotten eggs, and an unpleasant taste, because glutathione contains Sulphur. These undesirable attributes preclude the consumption of these beverages. Accordingly, there is an ongoing need for beverage compositions having an enhanced stability that are suitable for consumption.

Examples of related art are described below:

U.S. Pat. No. 5,171,597 discloses a method of preserving a beverage using a new use for glutamine and glutathione. Preservation is achieved by mixing with the beverage an effective amount of glutathione and glutamine, sufficient to inhibit the growth of micro-organisms in the beverage. This method is especially applicable to beer, but also is useful with other alcoholic and non-alcoholic beverages. A preferred, approximate maximum concentration of the effective agents, as applied to beer, is approximately 50 mg glutathione and 200 mg glutamine per 12 ounces of beer.

U.S. Pat. No. 8,623,429 discloses stable anthocyanin compositions, methods to prepare such compositions and also methods of use of such compositions to treat various afflictions. The disclosure describes unique compositions of an anthocyanin and a stabilizing compound such that the combination of the two components provides that the anthocyanin does not readily undergo degradation, such as oxidation or pH instability.

The article entitled "Non-enzymatic browning in citrus juice: chemical markers, their detection and ways to improve product quality" by S. Bharate and Sandip B. Bharate (published in Food Sci Technol (2014) 51(10):2271-2288) reviews various aspects of non-enzymatic browning (NEB) in citrus juice including the chemistry of NEB, identifiable markers of NEB, analytical methods to identify NEB markers and ways to improve the quality of citrus juice. NEB can be prevented by removal of amino acids/proteins (via ion exchange treatment) or by targeting NEB reactions (e.g. blockage of furfural/HMF by sulphiting agent).

The thesis entitled "Characterization and Mechanisms of Anthocyanin Degradation and Stabilization by Nathan Blaine Stebbins (published in Theses and Dissertations, No. 2618, University of Arkansas, Fayetteville) discloses mechanisms of anthocyanin degradation. The article entitled "Natural Pigments: Stabilization Methods of Anthocyanins for Food Applications" by Cortez et al. (published in Comprehensive Reviews in Food Science and Food Safety, Vol. 16, (2017) 180-198) summarizes the most recent studies and patents aimed at enhancing anthocyanin stability in food systems. The stabilizing methods include additions of co-pigment compounds, such as polymers, phenolic compounds, and metals. In addition, the exclusion of 02 during processing and storage, hard-panned candy-coating methods for blue, green, and brown colors, and various encapsulation techniques are evaluated as stabilizers of anthocyanins.

The article entitled "Effect of Natural Anti-browning Agents on Color and Related Enzymes in Fresh-Cut Fuji Apples as an Alternative to the Use of Ascorbic Acid" by Rojas-Grau et al. (published in Journal of Food Science (2008) Vol. 73, Nr. 6, S267-S272) discloses reports on the evaluation of the individual or combined use of ascorbic acid, 4-hexylresorcinol, N-acetylcysteine, and glutathione on the activity of polyphenoloxidase (PPO) and peroxidase (POD) in fresh-cut Fuji apples. PPO activity increased with storage time and was inhibited by the individual use of N-acetylcysteine and glutathione. POD activity in the apple slices was effectively inhibited by the combined use of ascorbic acid with any of the other anti-browning agents. The results obtained corroborated the effectiveness of other natural anti-browning agents over the traditional use of ascorbic acid in the control of the enzymatic browning in the fresh-cut fruit industry.

The article entitled "Stabilization of anthocyanins in blackberry juice by glutathione fortification" by Stebbins et al. (published in Food & Function (2017) 8, 3459-3468) evaluated 10 potential additives to stabilize anthocyanins during blackberry juice storage. The anthocyanin stabilizing agents used were glutathione, galacturonic acid, diethylenetriaminepentaacetic acid and tannic acid, which were added at a level of 500 mg $L^{-1}$. Juice anthocyanin, flavonol, and ellagitannin content and percent polymeric color were measured over five weeks of accelerated storage at 30° C. Glutathione had the greatest protective effect on total anthocyanins and polymeric color. Therefore, a second study was performed with glutathione in combination with lipoic and ascorbic acids in an effort to use antioxidant recycling to achieve a synergistic effect. However, the antioxidant recycling system had no protective effect relative to glutathione alone. Glutathione appears to be a promising blackberry The article entitled "Investigating the Interaction of Ascorbic Acid with Anthocyanins and Pyranoanthocyanins" (Farr and Giusti Molecules. (2018) 23; 23(4)) discloses that juices colored by anthocyanins experience color loss related to fortification with ascorbic acid (AA), thought to be the result of condensation at Carbon-4 of anthocyanins.

The article entitled "Inhibition of browning by anti-browning agents and phenolic acids or cinnamic acid in the glucose-lysine model" by Kwak et al. (published in Journal of the Science of Food and Agriculture (2005) 85(8):1337-1342 2005) reports on an investigation of the effects of anti-browning agents and phenolic acids or cinnamic acid on the inhibition of browning using a glucose-lysine model. Six anti-browning agents (cysteine, glutathione, sodium sulfite, pentasodium tripolyphosphate, citric acid and oxalic acid) and four phenolic acids (ferulic, hydroxybenzoic, syringic and vanillic acids) were tested. In order to investigate the anti-browning capacity of these agents, model solutions containing glucose, lysine and an anti-browning agent were heated at 50° C. in the presence of FeCl2, before being stored in nitrogen or air at 4° C. or 30° C. Browning was accelerated to some degree during storage in air at 30° C. In the case of storage at 4° C., however, no browning was detected in nitrogen after four weeks. Citric acid was the most efficient anti-browning agent during storage in air at 30° C. and inhibited browning to 36% after four weeks. However, its anti-browning capacity was increased by 8-15% in the presence of any of the phenolic acids or cinnamic acid, essentially independently of concentration in the range µM to 10 mM or the type of phenolic acid.

The article entitled "Effect of Anti-browning Agents on Browning and Intermediate Formation in the Glucose-Glutamic Acid Model" by Lim et al. (published in Journal of Food Science Vol. 75, Nr. 8, C678-C683) reports on the inhibitory effects of anti-browning agents on browning and the formation of intermediates such as 3-deoxyglucosone (3-DG) and hydroxymethylfurfural (HMF) were evaluated with a glucose-glutamic acid model for soybean paste. The initial anti-browning capacity was measured in the following order: pentasodium tripolyphosphate<citric acid and oxalic acid<cysteine and glutathione<sodium sulfite. The data showed that anti-browning agents, such as pentasodium tripolyphosphate, citric acid, and oxalic acid, were maintained anti-browning capacities during storage at both 4 and 30° C., respectively. However, both cysteine and glutathione were reduced with storage time, especially in the air. A marked effect of nitrogen treatment was noted for 3 of the anti-browning agents after storage in air at 30° C. in the following order: sodium sulfite<cysteine<glutathione. The formation ratio of 3-DG and HMF was higher after storage at 30° C. than at 4° C. These compounds were produced most abundantly in the presence of sodium sulfite, and the yields were not related significantly to the degree of browning. Citric acid and oxalic acid were identified as the most effective in inhibitors of browning and intermediates, even during storage in air at 30° C.

The article entitled "Various anti-browning agents and green tea extract during processing and storage" by Wang et al. (published in Journal of Food Processing and Preservation (2003) 27(3):213-225) discloses that the production of bottled green tea beverage has encountered a browning problem mainly caused by the autoxidation of flavonoids (catechins). Five anti-browning agents, ascorbic acid, kojic acid, citric acid, L-cysteine, and glutathione, were tested for their effectiveness on preventing the color changes of green tea extract during processing and storage. One-tenth percent of the anti-browning agents were individually added to the freshly prepared green tea extracts, heat processed at 121° C. for 1 min, and then stored in a 50° C. oven for up to 12 days. Samples of fresh, processed, and stored tea extracts were measured for their color maintenance and (−)-epigallocatechin gallate (EGCG) content to compare the anti-browning and antioxidant effects of these agents, respectively. Results indicated that the anti-browning activity and antioxidant effect of individual agents often did not correlate with each other, but citric acid showed both significant anti-browning and antioxidant effects on green tea extract. Wang reports glutathione increased the browning of the green tea beverage.

SUMMARY OF THE EMBODIMENTS

In a first aspect, a beverage composition having enhanced stability is disclosed comprising a plant-based composition comprising about 2% (v/v) or less of a fruit juice composition and a natural colorant from fruit and/or vegetables, an amount of glutathione effective at reducing browning of the beverage, wherein the beverage has a pH of less than about 4.

In certain embodiments of the first aspect, the amount of glutathione effective at reducing browning is about 65-860 µM.

In certain embodiments of the first aspect, the amount of glutathione effective at reducing browning is about 100 µM.

In certain embodiments of the first aspect, the amount of glutathione effective at reducing browning is about 150 µM.

In certain embodiments of the first aspect, the amount of glutathione effective at reducing browning is about 200 µM.

In certain embodiments of the first aspect, the amount of glutathione effective at reducing browning is about 250 µM.

In certain embodiments of the first aspect, the amount of glutathione effective at reducing browning is about 300 µM.

In certain embodiments of the first aspect, the amount of glutathione effective at reducing browning is about 350 µM.

In certain embodiments of the first aspect, the amount of glutathione effective at reducing browning is about 65-350 µM.

In certain embodiments of the first aspect, the amount of glutathione effective at reducing browning is about 150-350 µM.

In certain embodiments of the first aspect, the amount of glutathione effective at reducing browning is about 65-200 µM.

In certain embodiments of the first aspect, the amount of glutathione effective at reducing browning is about 65-150 µM.

In certain embodiments of the first aspect, the amount of glutathione effective at reducing browning is at least about 860 µM.

In certain embodiments of the first aspect, the browning is acid-induced.

In certain embodiments of the first aspect, the beverage does not smell or taste of sulfur. In certain embodiments of the first aspect, the beverage further comprises an edible acid. In certain embodiments of the first aspect, the edible acid comprises at least one of citric acid, malic acid, tartaric acid and ascorbic acid.

In certain embodiments of the first aspect, the edible acid is ascorbic acid.

In certain embodiments of the first aspect, the edible acid accelerates browning of the beverage when the beverage does not contain glutathione.

In certain embodiments of the first aspect, glutathione is in an amount effective at reducing browning and preserving the color of the beverage for about 3-9 months.

In certain embodiments of the first aspect, the beverage comprises Mango Cherimoya, Coconut Jackfruit, Tangerine Prickly Pear and/or Peach Mangosteen natural flavors.

In certain embodiments of the first aspect, the plant-based composition further comprises a green tea extract.

In certain embodiments of the first aspect, the beverage further comprises at least one of sweeteners from fruit and/or vegetables, and caffeine and electrolytes.

In a second aspect, a beverage composition having enhanced stability is disclosed comprising a plant-based composition comprising a green tea extract, an edible acid, an amount of glutathione effective at reducing browning of the beverage, wherein the beverage does not contain a fruit juice composition or a natural colorant from fruit and/or vegetables.

In certain embodiments of the second aspect, the beverage has a pH of less than about 4.

In certain embodiments of the second aspect, wherein the edible acid comprises citric acid, malic acid, tartaric acid, ascorbic acid or any combination thereof.

In certain embodiments of the second aspect, the amount of glutathione effective at reducing browning is about 150-350 µM.

In certain embodiments of the second aspect, the amount of glutathione effective at reducing browning is less than about 150 µM.

In certain embodiments of the second aspect, an amount of glutathione of about 860 µM accelerates browning of the beverage.

In a third aspect, a beverage composition having enhanced stability is disclosed consisting of a plant-based composition comprising a green tea extract and/or fruit juice composition, an edible acid, at least one of sweeteners, a colorant, a flavor and/or caffeine, and glutathione, wherein the glutathione is in an amount effective at reducing browning and preserving the color of the beverage for about 3-9 months.

BRIEF DESCRIPTION OF THE DRAWINGS

FIG. 1B depicts an exemplary Table showing data from a 6-month experiment comparing samples subjected to accelerated shelf life testing (FIG. 1A) to control samples which were stored in a refrigerator and not exposed to light.

FIG. 1D depicts an exemplary Table showing data from a 9-month experiment comparing samples subjected to accelerated shelf life testing (FIG. 1C) to control samples which were stored in a refrigerator and not exposed to light.

FIG. 2A shows an exemplary matrix to study the stability of a Peach Mangosteen flavored beverage containing a natural colorant from fruit and/or vegetable extracts in response to different amounts of ascorbic acid and glutathione.

FIG. 2B shows an exemplary matrix to study the stability of a Mango Cherimoya flavored beverage with a natural colorant from fruit and/or vegetable extracts in response to different amounts of ascorbic acid and glutathione.

FIG. 2C shows exemplary matrix to study the stability of a Mango Cherimoya flavored beverage containing a natural colorant from fruit and/or vegetable extracts in response to different amounts of ascorbic acid and glutathione.

FIG. 2D shows the amounts of glutathione and ascorbic acid present in samples 1-10 including equivalent molar concentrations.

FIG. 6 shows the results of a taste and smell test for sulfur in solutions of different amounts of glutathione (GSH) with or without citric acid.

DESCRIPTION OF THE PREFERRED EMBODIMENTS

Figure 1A:
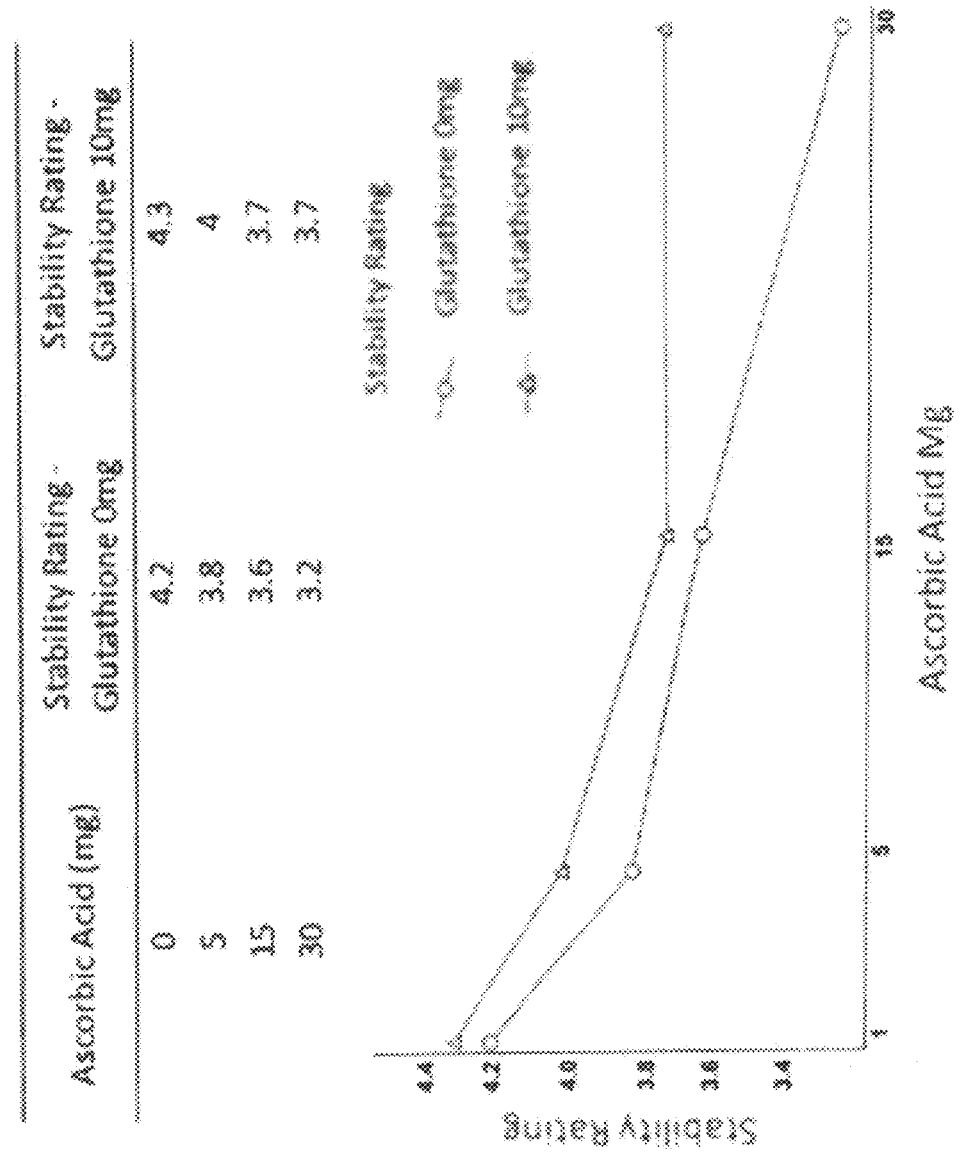
FIG. 1A depicts an exemplary graph showing 6-month stability data for a Peach Mangosteen beverage including different amounts of ascorbic acid and either 0 mg or 10 mg of glutathione.

The preferred embodiments of the present invention will now be described with reference to the drawings. Identical elements in the various figures are identified with the same reference numerals.

Reference will now be made in detail to each embodiment of the present disclosure. Such embodiments are provided by way of explanation of the present disclosure, which is not intended to be limited thereto. In fact, those of ordinary skill in the art may appreciate upon reading the present specification and viewing the present drawings that various modifications and variations can be made thereto.

Definitions

Unless defined otherwise, all technical and scientific terms used herein have the same meanings as commonly understood by one of skill in the art to which the disclosure herein belongs.

As used herein, the singular forms "a," "an," and "the," are intended to include the plural forms as well, unless the context clearly indicates otherwise.

The phrase "and/or," as used herein in the specification and in the claims, should be understood to mean "either or both" of the elements so conjoined, i.e., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In certain embodiments, the term "about" or "approximately" as used herein means within an acceptable error range for the particular value as determined by one of ordinary skill in the art, which will depend in part on how the value is measured or determined, i.e., the limitations of the measurement system.

In certain embodiments, "about" can mean within 3 or more than 3 standard deviations, per the practice in the art.

In certain embodiments, particularly with respect to biological systems or processes, the term can mean within an order of magnitude, preferably within 5-fold, and more preferably within 2-fold, of a value.

In certain embodiments, when the term "about" or "approximately" is used in conjunction with a numerical range, it modifies that range by extending the boundaries above and below those numerical values. In general, the term "about" is used herein to modify a numerical value above and below the stated value by a variance of 20%, 10%, 5%, or 1%. In certain embodiments, the term "about" is used to modify a numerical value above and below the stated value by a variance of 10%. In certain embodiments, the term "about" is used to modify a numerical value above and below the stated value by a variance of 5%. In certain embodiments, the term "about" is used to modify a numerical value above and below the stated value by a variance of 1%.

When a range of values is listed herein, it is intended to encompass each value and sub-range within that range. For example, "about 1-5 ng" or "from about 1 ng to about 5 ng" is intended to encompass about 1 ng, 2 ng, 3 ng, 4 ng, 5 ng, 1-2 ng, 1-3 ng, 1-4 ng, 1-5 ng, 2-3 ng, 2-4 ng, 2-5 ng, 3-4 ng, 3-5 ng, and 4-5 ng.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The term "beverage" or "beverage composition" as used herein means any drinkable liquid or semi-liquid, including for example flavored water, soft drinks, fruit drinks, coffee-based drinks, tea-based drinks, juice-based drinks, milk-based drinks, jelly drinks, carbonated or non-carbonated drinks, alcoholic or non-alcoholic drinks.

As used herein, the term "instant" or "present" beverage refers to any one of the beverages disclosed herein.

In certain embodiments, a plant-based composition can include juice-based compositions, natural flavors from fruit and/or vegetables, natural plant-based sugar free sweeteners such as erythritol, *stevia*, and/or monk fruit, sugar-based sweeteners, natural colorant from fruit and/or vegetables, a green tea extract or plant-based micronutrient such as polyphenols.

In certain embodiments, the beverage may also include electrolytes such as magnesium, sodium, or potassium, caffeine from natural sources, vitamins such as vitamin A and/or vitamin, B12.

In certain embodiments, the natural colorant can be a carotenoid, such as beta carotene.

In certain embodiments, a beverage disclosed herein may be made from a "beverage concentrate" or "beverage base," i.e., an intermediate beverage product which, when mixed with an appropriate amount of water or other suitable liquid or semi-liquid and/or a sweetening agent, forms a beverage syrup or alternatively a beverage. A beverage concentrate may comprise a flavoring agent and/or optional additives.

As used herein, "taste" refers to a combination of sweetness perception, temporal effects of sweetness perception, i.e., on-set and duration, off-tastes, e.g., bitterness and metallic taste, residual perception (aftertaste) and tactile perception, e.g., body and thickness.

As used herein, "stability" or "stable" means that there is no visually apparent difference among similar solutions having an age difference equal to a desired predetermined shelf life. In other words, if it is determined that a desired shelf life is 140 days, then a "stable" solution filled into a container 140 days earlier would not have any visually apparent difference in color and/or smell and/or taste than a freshly-filled container of the same or similar formulation.

Accordingly, the ingredients of the instant beverage impart an enhanced stability which prevents browning and preserves color of the beverage and maintains its taste and smell after the equivalent of at least about 1, 7, 14, 21, 28, 35, 42, 49, 56, 63, 69, 76, 83, 90, 97, 104, 111, 118, 125, 133, 140, 150, 200, 250 or 300 days.

Accordingly, the ingredients of the instant beverage impart an enhanced stability which prevents browning of the beverage and maintains its taste and smell after the equivalent of at least 1, 2, 3, 4, 5, 6 or more months of storage.

In certain embodiments, glutathione inhibits browning of the instant beverage for at least about 1, 2, 3, 4, 5, 6, 7, 8 or 9 months.

In certain embodiments, glutathione inhibits browning and preserves color of the instant beverage for at least about 3-9 months.

In certain embodiments, the instant beverage may contain fruit juice, fruit extracts, vegetable extracts or combinations thereof. In certain embodiments, these ingredients are natural products, not artificial products. Thus, while the instant beverage may also contain, for example, artificial colors, flavors or sweeteners, the present beverage compositions do contain natural fruit juice, natural fruit and/or vegetable flavors or combinations thereof.

Unless otherwise stated, a percent w/w solution means % by weight of the total, preferably dry powder, composition.

Unless otherwise stated, a percent w/v solution is calculated with the following formula using the gram as the base measure of weight (w): % w/v=g of solute/100 mL of solution.

Juice-Based Compositions

A juice-based composition may contain a juice component obtained from fruit or vegetable. The juice component can be used in any form such as a juice form, a concentrate, an extract, a powder, or the like.

Suitable juices include, for example, citrus juice, non-citrus juice, or mixtures thereof, which are known for use in beverages. Examples of such juices include, non-citrus juices such as apple juice, grape juice, pear juice, nectarine juice, currant juice, raspberry juice, gooseberry juice, blackberry juice, blueberry juice, strawberry juice, custard-apple juice, pomegranate juice, guava juice, kiwi juice, mango juice, *papaya* juice, watermelon juice, cantaloupe juice, cherry juice, cranberry juice, coconut water, peach juice, apricot juice, plum juice, and pineapple juice; citrus juices such as orange juice, lemon juice, lime juice, grapefruit juice, and tangerine juice; and vegetable juice such as carrot juice and tomato juice; or a combination comprising at least one of the foregoing juices.

In certain embodiments, the juice-based composition can be non-carbonated or carbonated.

In certain embodiments, the juice-based composition can be fortified with solubilized calcium in the form of calcium carbonate, calcium oxide, or calcium hydroxide, for example. A food-grade acid is added to the calcium fortified juice-based composition to improve the solubility of calcium.

In certain embodiments, the juice-based composition can be formed from a fruit or vegetable using a hot break or cold break process. In both processes, the fruit or vegetable is macerated and passed through conventional equipment to separate out seeds, skins and other undesired solids. The composition is then concentrated by conventional techniques. In hot break processes, the fruit or vegetable is typically heated during maceration or immediately thereafter to deactivate enzymes that may degrade the product and decrease the viscosity of the product. In cold break processes, the fruit or vegetable typically are processed at lower temperatures than hot break. A hot break process accordingly may provide a thicker product than those produced by a cold break process.

In certain embodiments, the juice-based composition can be pasteurized to destroy unwanted microorganisms. Suitable pasteurization conditions of juice-based compositions can be selected by one of ordinary skill in the art without undue experimentation using the guidelines provided. An exemplary pasteurization process to sterilize the juice-based composition is by heating the composition to about 60 to about 80° C. for about 6 to about 15 minutes in an aseptic environment.

In certain embodiments, the juice-based composition can be filled into a beverage container and then subjected to pasteurization conditions. Alternatively, the composition can be hot-filled into a beverage container at temperatures sufficient to sterilize the composition in the container.

In another embodiment, the juice-based composition can contain a preservative allowing the composition to be cold-filled into a beverage container without the need for pasteurization. Specifically, the preservatives can be added to lower the pH level of the beverage to pH of about 3 to about 4.5.

In another embodiment, the juice-based composition can be aseptically cold-filled.

In certain embodiments, the amount of a juice-based composition in a beverage can be about 0.1 wt % to about 2 wt % based on the total weight of the composition.

In certain embodiments, the amount of a juice-based composition in a beverage can be 0% or about 0.1, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9% or about 2%.

Water

In certain embodiments, the instant beverage described herein may contain a portion of added water. As used herein "added water" does not include water incidentally added to the composition through other components such as milk or a fruit juice component, for example. In certain embodiments, the beverage compositions may contain up to about 99 weight percent (wt %) added water based on the total weight of the composition, specifically about 0.1 to about 90 wt %, more specifically about 1.0 to about 80 wt %, and yet more specifically about 5.0 to about 70 wt % added water each based on the total weight of the composition.

In certain embodiments, the added water is specifically purified prior to use using processes well-known in the art such as filtration, deionization, distillation, or reverse osmosis.

Flavors

In certain embodiments, the instant beverage comprises a flavor (flavorings or flavor agents), such as natural and artificial flavors known to the skilled artisan. For example, flavorings may be chosen from synthetic flavor oils and flavoring aromatics and/or oils, oleoresins and extracts derived from plants, leaves, flowers, fruits, and so forth, and combinations thereof. Nonlimiting exemplary flavor oils include spearmint oil, cinnamon oil, oil of wintergreen (methyl salicylate), peppermint oil, Japanese mint oil, clove oil, bay oil, anise oil, *eucalyptus* oil, thyme oil, cedar leaf oil, oil of nutmeg, all spice, oil of sage, mace, oil of bitter almonds, and *cassia* oil. Also useful flavorings are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, watermelon, apricot, banana, melon, apricot, ume, cherry, raspberry, blackberry, tropical fruit, mango, mangosteen, pomegranate, *papaya* and so forth.

In certain embodiments, flavorings may include aldehydes and esters such as cinnamyl acetate, cinnamaldehyde, citral diethylacetal, dihydrocarvyl acetate, eugenyl formate, p-methylamisol, and so forth. Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), 10 vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal 15 (green fruit), and 2-dodecenal (citrus, mandarin), cherry, grape, strawberry shortcake, and mixtures thereof.

In certain embodiments, any flavoring or food additive such as those described in Chemicals Used in Food Processing, publication 1274, pages 63-258, by the National Academy of Sciences, may be add to a beverage of the instant disclosure. This publication is incorporated herein by reference herein in its entirety.

Sweeteners

In certain embodiments, the instant beverage can be a reduced-calorie beverage comprising a non-nutritive sweetener or sweetener blend or a sugar alcohol to improve the overall taste. Sugar alcohol blocks the lingering sweetness and the bitter/metallic aftertaste associated with the use of 25 non-nutritive sweeteners. For example, sugar alcohols can include, for example, sorbitol, mannitol, lactitol, maltitol, xylitol, erythritol and/or combinations thereof.

In certain embodiments, the instant beverage includes erythritol, i.e., meso-erythritol, a 4-carbon sugar alcohol is reported to generate almost no calories (0.2 calorie/g).

In certain embodiments, the instant beverage can include *stevia*, a non-caloric sweetener of natural origin that is isolated from the leaves of a sweet herb called *Stevia rebaudiana* Bertoni which contain rebaudioside A/M (Reb A, Reb M) and stevioside, two steviol glycosides that are about 100-300 times sweeter than sugar. Methods for extracting and purifying sweet glycosides from the *Stevia rebaudiana* plant using water or organic solvents are described, for example, in U.S. Pat. Nos. 4,361,697; 4,082,858; 4,892,938; 5,972,120; 5,962,678; 7,838,044 and 7,862,845.

In certain embodiments, the instant beverage may include an extract of monk fruit or luo han guo (Siraitia grosvenorii), a herbaceous perennial vine of the gourd family, Cucurbitaceae, native to southern China and northern Thailand. The extract is nearly 300 times sweeter than sugar and has been used in China as a low-calorie sweetener for cooling drinks.

Citric Acid, Magnesium Citrate and Potassium Citrate

In certain embodiments, the instant beverage may contain a cation component which contains a mixture of key cations, e.g., magnesium and potassium in combination with an acid component which contains key edible acids (citric acid, malic acid/succinic acid, and/or phosphoric acid), provide improved overall flavor impressions in liquid beverages, especially carbonated soft drinks. The specific cation-acid mixtures impart an improved sweetness perception to the beverage. In particular, the specific mixtures of cations-acids impart significantly increased body to the overall flavor and texture impression. Further, by appropriate balancing of the cation component relative to the acid component, the sourness of the beverage can be controlled over a broad pH range. Beverages containing specific cation-edible acid mixtures for improved flavor impression are described in U.S. Pat. No. 4,551,342, the content of which is incorporated by reference herein in its entirety.

Carotenoids

In certain embodiments, the instant beverage may contain one or more carotenoids. There are about 600 carotenoids in nature of which the six major ones in the diet are -carotene, lycopene, lutein, -cryptoxanthin, a-carotene and zeaxanthin.

In certain embodiments, the carotenoid can be beta-carotene, a pro-vitamin of vitamin A. As used herein, beta-carotene can be used as a coloring agent to change the color of a white product to be light yellow. The higher the carotenoid content, the more intense the color is. Food stuffs comprising carotenoids are disclosed, for example, in the published U.S. patent application No. 2003/0017239, the content of which is incorporated by reference herein in its entirety.

Exberry Shade Red

In certain embodiments, the instant beverage may contain an EXBERRY® coloring foodstuff, e.g., EXBERRY Shade "Red" (Product No. 153330) and/or an EXBERRY Shade "Bordeaux" (Product No. 181524) made from edible fruits, vegetables, and plants. The colors are manufactured through physical processes without selective extraction of pigments, and the colors retain the characteristics of the source material. The fruit and vegetable concentrates are classed as food ingredients, delivering healthy, clean-label color for food products.

Guarana Extract

Guarana (*Paullinia cupana*) is a climbing plant native to the Amazon basin and especially common in Brazil. The guarana seed contains about twice the concentration of caffeine found in coffee seeds. A process for the manufacture of an extract from dry guarana seeds is disclosed, for example, in WO/2006/032119, the content of which is incorporated by reference herein in its entirety.

Green Tea Extracts

Green tea extracts are produced through the steaming and drying of the leaves or buds of the plant *Camellia sinensis*. An extract of green tea contains caffeine as well as polyphenols, 20 commonly known as tea catechins or flavanols including epigallocatechin gallate (EGCG), epigallocatechin (EGC), epicatechin gallate (ECG), and epicatechin (EC). Of these, EGCG is the most abundant and possesses the most potent antioxidative activity.

Exemplary methods for producing green tea extracts with enhanced polyphenol potency require elevated temperatures during the extraction process and/or the use of specialized chemicals or organic solvents. For example, U.S. Pat. No. 4,613,672 to Hara, which is incorporated herein by reference, discloses processes for the production of tea catechins. Specific catechins, such as epicatechin, epigallocatechin, epicatechin gallate, and epigallocatechin gallate may be produced by extracting tea leaves with hot water or an aqueous solution of methanol, ethanol, or acetone, washing the extract containing solution with chloroform, transferring the washed solution into an organic solvent, removing the solution and then passing it through a reversed phase column in the presence of an eluting solution. Additionally, U.S. Pat. No. 5,989,557, to Bombardelli et al. which is incorporated herein by reference, discloses an elaborate multi-step method for preparation of novel polyphenol fractions of *Camellia sinensis* which requires a number of organic solvents and several phase separations. Another exemplary method of producing a green tea extract is disclosed in U.S. Pat. No. 7,815,960.

The browning of green tea extract is described, for example, in Doris et al. J Food Sci. 2018 April; 83(4):911-921; Wrolstad et al., Trends in Food Science & Technology 16 (2005) 423-428, and S Wahyuningsih et al. (2017) IOP Conf. Ser.: Mater. Sci. Eng. 193 012047.

Ascorbic Acid

In certain embodiments, the term "ascorbic acid" having the formula C6HsO6, refers to one or more of ascorbic acid, its isomers, derivatives thereof, and salts of the foregoing. In certain embodiments, ascorbic acid can include ascorbic acid; ascorbic acid isomers such as erythorbic acid; derivatives of the ascorbic acid isomers, such as ascorbic acid 2,6-dipalmitate, ascorbic acid 6-stearate, sodium ascorbate-diphosphate, disodium ascorbate-disuifate, ascorbic acid 2-giucoside, glucosamine ascorbate. L-dehydroascorbic acid, ascorbic acid 6-palmitate, L-ascorbyl tetraisopalmitate, ascorbyl tetra-2-hexyldecanoate, and L-ascorbyl magnesium phosphate; as well as salts of the ascorbic acid and the ascorbic acid derivatives, including: salts thereof with an alkali metal such as sodium and potassium; salts thereof with an alkali earth metal such as calcium, magnesium, and barium; basic amino acid salts such as arginine and lysine; ammonium salts such as ammomum salt and tricyclohexylammonium salt; alkanolamine salts such as monoisopropanolamine salt, diisopropanolamine salt, and triisopropanolamine salt. Among the above examples, ascorbic acid, erythorbic acid, and salts thereof are preferably used, and sodium ascorbate and sodium erythorbate are more preferably used.

Ascorbic acid, otherwise known as vitamin C, occurs naturally in many fresh fruits and vegetables, from oranges and grapefruits to broccoli, Brussel sprouts and tomatoes. However vitamin C content is often diminished by heat, boiling water or air exposure. For this reason, food stuffs can be fortified with ascorbic acid to help replenish vitamin C content and to reinforce a citrus flavor. Ascorbic acid is also added to food stuffs as a preservative to prevent spoiling. Ascorbic acid is a potent antioxidant that slows the oxidation process and its low pH also helps preclude microbial growth.

In certain embodiments, the instant beverage composition comprises about 5 mg to 30 mg ascorbic acid per 16 oz. (about 473 ml), or from about 0.001% w/v to about 0.006% w/v.

In certain embodiments, the amount of ascorbic acid in the beverages disclosed herein can be 0 or about 1 µM, 6 µM, 11 µM, 16 µM, 21 µM, 26 µM, 31 µM, 36 µM, 41 µM, 46 µM, 51 µM, 56 µM, 61 µM, 66 µM, 71 µM, 76 µM, 81 µM, 86 µM, 91 µM, 96 µM, 101 µM, 106 µM, 111 µM, 116 µM, 121 µM, 126 µM, 131 µM, 136 µM, 141 µM, 146 µM, 151 µM, 156 µM, 161 µM, 166 µM, 171 µM, 176 µM, 181 µM, 186 µM, 191 µM, 196 µM, 201 µM, 206 µM, 211 µM, 216 µM, 221 µM, 226 µM, 231 µM, 236 µM, 241 µM, 246 µM, 251 µM, 256 µM, 261 µM, 266 µM, 271 µM, 276 µM, 281 µM, 286 µM, 291 µM, 296 µM, 301 µM, 306 µM, 311 µM, 316 µM, 321 µM, 326 µM, 331 µM, 336 µM, 341 µM, 346 µM, 351 µM, 356 µM, 361 µM, 366 µM, 371 µM, 376 µM, 381 µM, 386 µM, 391 µM, 396 µM, 401 µM, 406 µM, 411 µM, 416 µM, 421 µM, 426 µM, 431 µM, 436 µM, 441 µM, 446 µM, 451 µM, 456 µM, 461 µM, 466 µM, 471 µM, 476 µM, 481 µM, 486 µM, 491 µM, 496 µM, 501 µM, 506 µM, 511 µM, 516 µM, 521 µM, 526 µM, 531 µM, 536 µM, 541 µM, 546 µM, 551 µM, 556 µM, 561 µM, 566 µM, 571 µM, 576 µM, 581 µM, 586 µM, 591 µM, 596 µM, 601 µM, 606 µM, 611 µM, 616 µM, 621 µM, 626 µM, 631 µM, 636 µM, 641 µM, 646 µM, 651 µM, 656 µM, 661 µM, 666 µM, 671 µM, 676 µM, 681 µM, 686 µM, 691 µM, 696 µM, 701 µM, 706 µM, 711 µM, 716 µM, 721 µM, 726 µM, 731 µM, 736 µM, 741 µM, 746 µM, 751 µM, 756 µM, 761 µM, 766 µM, 771 µM, 776 µM, 781 µM, 786 µM, 791 µM, 796 µM, 801 µM, 806 µM, 811 µM, 816 µM, 821 µM, 826 µM, 831 µM, 836 µM, 841 µM, 846 µM, 851 µM, 856 µM, 861 µM, 866 µM, 871 µM, 876 µM, 881 µM, 886 µM, 891 µM, 896 µM, 901 µM, 906 µM, 911 µM, 916 µM, 921 µM, 926 µM, 931 µM, 936 µM, 941 µM, 946 µM, 951 µM, 956 µM, 961 µM, 966 µM, 971 µM, 976 µM, 981 µM, 986 µM, 991 µM, 996 µM, 1001 µM, or 1006 µM.

"Edible acids," as used herein, refer to commonly known food additives also known as organic acids or food acids. Edible acids are found in natural food products that taste sour.

Exemplary edible acids include, but are not limited to, lactic acid, citric acid, malic acid, acetic acid, benzoic acid, ascorbic acid, tartaric acid, oxalic acid, tannic acid, and butyric acid. In a preferred embodiment, the edible acid is aspartic acid.

The pH of any one of the disclosed beverages can be about 3, 3.5, 4, 4.5, 5, 5.5, 6 or 6.5. In a preferred embodiment, the disclosed beverages have a pH of about 4.

Glutathione

The tripeptide glutathione (GSH) (gamma-glutamyl-cysteinyl-glycine), is an antioxidant. When oxidized, it forms a dimer (GSSG), which may be recycled by glutathione reductase. Glutathione is widely distributed in nature, including yeast cells, plants and animals.

The source of glutathione used in the present invention is not important, and thus glutathione may be synthesized or isolated by methods conventional in the art or purchased. In certain embodiments, glutathione can include derivatives of glutathione including, for example, those derivatives described in U.S. Pat. No. 6,627,732, the content of which is incorporated by reference herein in its entirety.

In certain embodiments, the amount of glutathione in any of the beverages disclosed herein can be OM or about 1 µM, 6 µM, 11 µM, 16 µM, 21 µM, 26 µM, 31 µM, 36 µM, 41 µM, 46 µM, 51 µM, 56 µM, 61 µM, 66 µM, 71 µM, 76 µM, 81 µM, 86 µM, 91 µM, 96 µM, 101 µM, 106 µM, 111 µM, 116 µM, 121 µM, 126 µM, 131 µM, 136 µM, 141 µM, 146 µM, 151 µM, 156 µM, 161 µM, 166 µM, 171 µM, 176 µM, 181 µM, 186 µM, 191 µM, 196 µM, 201 µM, 206 µM, 211 µM, 216 µM, 221 µM, 226 µM, 231 µM, 236 µM, 241 µM, 246 µM, 251 µM, 256 µM, 261 µM, 266 µM, 271 µM, 276 µM, 281 µM, 286 µM, 291 µM, 296 µM, 301 µM, 306 µM, 311 µM, 316 µM, 321 µM, 326 µM, 331 µM, 336 µM, 341 µM, 346 µM, 351 µM, 356 µM, 361 µM, 366 µM, 371 µM, 376 µM, 381 µM, 386 µM, 391 µM, 396 µM, 401 µM, 406 µM, 411 µM, 416 µM, 421 µM, 426 µM, 431 µM, 436 µM, 441 µM, 446 µM, 451 µM, 456 µM, 461 µM, 466 µM, 471 µM, 476 µM, 481 µM, 486 µM, 491 µM, 496 µM, 501 µM, 506 µM, 511 µM, 516 µM, 521 µM, 526 µM, 531 µM, 536 µM, 541 µM, 546 µM, 551 µM, 556 µM, 561 µM, 566 µM, 571 µM, 576 µM, 581 µM, 586 µM, 591 µM, 596 µM, 601 µM, 606 µM, 611 µM, 616 µM, 621 µM, 626 µM, 631 µM, 636 µM, 641 µM, 646 µM, 651 µM, 656 µM, 661 µM, 666 µM, 671 µM, 676 µM, 681 µM, 686 µM, 691 µM, 696 µM, 701 µM, 706 µM, 711 µM, 716 µM, 721 µM, 726 µM, 731 µM, 736 µM, 741 µM, 746 µM, 751 µM, 756 µM, 761 µM, 766 µM, 771 µM, 776 µM, 781 µM, 786 µM, 791 µM, 796 µM, 801 µM, 806 µM, 811 µM, 816 µM, 821 µM, 826 µM, 831 µM, 836 µM, 841 µM, 846 µM, 851 µM, 856 µM, 861 µM, 866 µM, 871 µM, 876 µM, 881 µM, 886 µM, 891 µM, 896 µM, 901 µM, 906 µM, 911 µM, 916 µM, 921 µM, 926 µM, 931 µM, 936 µM, 941 µM, 946 µM, 951 µM, 956 µM, 961 µM, 966 µM, 971 µM, 976 µM, 981 µM, 986 µM, 991 µM, 996 µM, 1001 µM, or 1006 µM.

In certain embodiments, the amount of glutathione in any of the beverages disclosed herein can be 0-150 M or about 1-150 µM, 6-150 µM, 11-150 µM, 16-150 µM, 21-150 µM, 26-150 µM, 31-150 µM, 36-150 µM, 41-150 µM, 46-150 µM, 51-150 µM, 56-150 µM, 61-150 µM, 66-150 µM, 71-150 µM, 76-150 µM, 81-150 µM, 86-150 µM, 91-150 µM, 96-150 µM, 101-150 µM, 106-150 µM, 111-150 µM, 116-150 µM, 121-150 µM, 126-150 µM, 131-150 µM, 136-150 µM, 141-150 µM, or about 146-150 µM.

In certain embodiments, the amount of glutathione in any of the beverages disclosed herein can be 0-150 M or about 1-143 µM, 1-136 µM, 1-131 µM, 1-126 µM, 1-121 µM, 1-116 µM, 1-111 µM, 1-106 µM, 1-101 µM, 1-106 µM, 1-101 µM, 1-96 µM, 1-91 µM, 1-86 µM, 1-81 µM, 1-76 µM, 1-71 µM, 1-66 µM, 1-61 µM, 1-56 µM, 1-51 µM, 1-46 µM, 1-41 µM, 1-36 µM, 1-31 µM, 1-26 µM, 1-21 µM, 1-16 µM, 1-11 µM or 1-6 µM.

Glutathione naturally has a very strong Sulphur smell and taste. When small amounts of glutathione are dissolved in plain water, the Sulphur smell and taste are pronounced. Surprisingly, when acid is added to the beverages disclosed herein, the Sulphur smell and taste was neutralized.

In certain embodiments, the beverage compositions of the present invention contain between about 5 mg to about 100 mg of glutathione per 16 oz. (about 473 ml), or from about 0.001% w/v to about 0.021% w/v.

Ascorbic Acid and Glutathione

The concentration ranges of ascorbic acid and glutathione are important for the present invention. As noted above, the preferred concentration ranges for ascorbic acid are from about 0.001% w/v to about 0.006% w/v and the preferred concentration ranges for glutathione are from about 0.001% w/v to about 0.021% w/v. In these ranges, the browning and color degradation of the beverage compositions are inhibited or prevented. This increases the shelf life of the inventive beverage compositions. Also, the concentration of glutathione in the presence of ascorbic acid in the above concentrations is low enough to avoid the bad taste and smell associated with glutathione because glutathione contains Sulphur.

Although the above concentration ranges for ascorbic acid and glutathione are preferred, in certain embodiments, 60 mg of ascorbic acid per 16 oz. (about 0.013% w/v) can be used without deleterious effects on the shelf life of the product. In certain embodiments, 125 mg of glutathione per 16 oz. (about 0.026% w/v) can be used without observing the bad smell or taste of glutathione. In certain embodiments, at a higher concentration of glutathione of 150 mg per 16 oz. (about 0.032% w/v), the bad taste of glutathione was detected.

Preferred beverage compositions can contain additional ingredients. For example, a preferred beverage composition will come as a ready to drink 16 fluid ounce enhanced water beverage.

In certain embodiments, the beverages disclosed herein can be low calorie comprising 10 calories per 16 oz. serving.

In certain embodiments, the beverages disclosed herein may comprise sugar-free sweeteners, e.g. erythritol, *stevia* and monk fruit blend.

In certain embodiments, the beverages disclosed herein may comprise sugar based sweeteners, e.g. cane sugar, agave, honey, and corn syrup.

In certain embodiments, the beverages disclosed herein may comprise from about 1% v/v to 5% v/v of a juice-based composition. In certain embodiments, the beverages disclosed herein may comprise from about 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75% or 5% (w/v) juice-based composition.

In certain embodiments, the beverages disclosed herein may comprise 0.25-5%, 0.5%-5%, 1-5%, 2-5%, 3-5% or 4-5% (w/v) juice-based composition.

In certain embodiments, the beverages disclosed herein may comprise about 0-025%, 0.25-5%, 0.25%-4.75%, 0.25%-4.5%, 0.25%-4.25%, 0.25%-4%, 0.25%-3.75%, 0.25%-3.5%, 0.25%-3.25%, 0.25%-3%, 0.25%-2.75%, 0.25%-2.5%, 0.25%-2.25%, 0.25%-2%, 0.25%-1.75%, 0.25%-1.5%, 0.25-1.25%, 0.25%-1%, 0.25%-0.75% or 0.25-0.5% (w/v) juice-based composition.

In certain embodiments, the beverages disclosed herein may comprise about 1-40 mg of caffeine from green tea extract and/or guarana extract.

In certain embodiments, the beverages disclosed herein may comprise natural flavors.

In certain embodiments, the beverages disclosed herein may comprise natural flavors from fruit and/or vegetables.

In certain embodiments, citric acid can be added to regulate acidity.

In certain embodiments, the beverages disclosed herein may be non-carbonated or non-carbonated.

In certain embodiments, the beverages disclosed herein may be non-alcoholic.

In certain embodiments, the beverages disclosed herein may comprise alcohol.

In certain embodiments, alcohol may be added to the beverages disclosed herein prior to consumption.

In certain embodiments, the beverages disclosed herein may comprise 5 mg to 100 mg glutathione and 5 mg to 30 mg ascorbic acid.

In certain embodiments, the beverages disclosed herein may comprise about 50 mg to 195 mg polyphenols.

In certain embodiments, the beverages disclosed herein may comprise about 0.1 mg to 10 mg carotenoids.

In certain embodiments, the beverages disclosed herein may comprise 30 mg to 65 mg magnesium, preferably freebase.

In certain embodiments, the beverages disclosed herein may comprise about 30 mg to 65 mg potassium, preferably freebase.

In certain embodiments, the beverages disclosed herein may comprise 10 mg to 20 mg glycine.

In certain embodiments, the beverages disclosed herein may comprise about 10 μg to 20 μg selenium.

In certain embodiments, the beverages disclosed herein may comprise optional additives including, for example, antioxidants, amino acids, caffeine, coloring agents ("colorants", "colorings"), emulsifiers, flavor potentiators, food-grade acids, minerals, micronutrients, plant extracts, phytochemicals ("phytonutrients"), preservatives, salts including buffering salts, stabilizers, thickening agents, medicaments, vitamins, and any combination comprising at least one of the foregoing additives.

In certain embodiments, the aforementioned beverages do not contain glutamine.

In certain embodiments, ascorbic acid and glutathione are from about 0.0011% w/v to about 0.013% w/v for ascorbic acid and from about 0.001% w/v to about 0.026% w/v for glutathione.

In certain embodiments, ascorbic acid is present in a range of from about 0.001% w/v to about 0.006% w/v and glutathione is present in an amount of from about 0.001% w/v to about 0.021% w/v.

In certain embodiments, the use of other acidic compounds suitable for use in these beverage compositions, for example citric acid, tartaric acid or malic acid, also avoids the unpleasant smell and taste of glutathione.

In certain embodiments, the amount of glutathione effective added to any one of the beverages disclosed herein can reduce browning by about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 100%.

In certain embodiments, the amount of glutathione effective added to any one of the beverages disclosed herein can reduce browning by at least 5%, at least 10%, amount 15%, at least 20%, at least 25%, at least 30%, at least 35%, at least 40%, at least 45%, at least 50%, at least 55%, at least 60%, about 65%, at least 70%, at least 75%, at least 80%, at least 85%, at least 90%, at least 95% or at least 100%.

In certain embodiments, the amount of glutathione effective added to any one of the beverages disclosed herein can reduce browning by about 5-100%, about 10-100%, amount 15-100%, about 20-100%, about 25-100%, about 30-100%, about 35-100%, about 40-100%, about 45-100%, about 50-100%, about 55-100%, about 60-100%, about 65-100%, about 70-100%, about 75-100%, about 80-100%, about 85-100%, about 90-100%, about 95-100% or about 100%.

In certain embodiments, the amount of glutathione effective added to any one of the beverages disclosed herein can reduce browning by about 5-100%, about 10-100%, about 15-100%, about 20-100%, about 25-100%, about 30-100%, about 35-100%, about 40-100%, about 45-100%, about 50-100%, about 55-100%, about 60-100%, about 65-100%, about 70-100%, about 75-100%, about 80-100%, about 85-100%, about 90-100 or about 95-100%.

Although this invention has been described with a certain degree of particularity, it is to be understood that the present disclosure has been made only by way of illustration and that numerous changes in the details of construction and arrangement of parts may be resorted to without departing from the spirit and the scope of the invention.

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EXAMPLES

Example I: Beverage Preparations

Filtered water was first heated on a hot plate. The following dry ingredients were then added: erythritol; *stevia*; monk fruit; citric acid; ascorbic acid; glutathione; magnesium citrate; potassium citrate; green tea extracts (for caffeine and polyphenols); guarana extract (for caffeine); and carotenoids (beta-carotene). The following wet ingredients were then added: fruit juice concentrates; natural flavors; and fruit and vegetable extracts (for color). All ingredients were then blended thoroughly. The beverage was pasteurized and heated to the hot filling temperature, generally between 190° and 203° F. (88° to 95° C.) for at least 15 to 30 seconds. This process typically kills all microorganisms in the liquid. The liquid is cooled to around 180° to 185° F. (82° to 85° C.) and filled at the filling station.

Example II: First Round of Stability Studies

Stability studies were conducted as follows. Test samples containing Peach Mangosteen flavor were subjected to a stability study with 6-month and 9-month time points using accelerated shelf life studies. Here, a set of samples were made up based on the test matrix (Peach Mangosteen flavor with either 0 mg, 5 mg, 15 mg or 30 mg of ascorbic acid and either 0 mg or 10 mg glutathione).

One set of samples were placed in an accelerated stability chamber which was heated to 100° F. and the samples were exposed to fluorescent light. The second set of samples, to be used as controls, were placed in a refrigerator and not subjected to light. Each sample was 8 ounces and the containers used were plastic bottles. For those samples which were placed in the accelerated stability chamber, 1 week in the chamber equals 1 month of the product being on a store shelf. Thus, a sample left in the chamber for 6 weeks equals 6 months on a store shelf and a sample left in the chamber for 9 weeks equals 9 months on a store shelf. Once the stability testing was completed, the samples were removed and compared to their refrigerated controls. A score or Stability Rating was then assigned based on that comparison. A Stability Rating below 2.4 is considered unstable.

FIG. 1A shows the 6-month Stability Study for the Peach Mangosteen flavored beverage with and without glutathione. As shown, the samples containing 10 mg glutathione were more stable than the samples containing 0 mg glutathione. For samples containing 30 mg ascorbic acid, the sample containing 10 mg glutathione had a Stability Rating of 3.7 while the sample containing 0 mg glutathione had a Stability Rating of 3.2. At these concentrations, glutathione demonstrates the ability to preserve color and inhibit browning, yet without producing an unpleasant Sulphur smell or taste.

FIG. 1B is the 6-Month Data Table comparing the Peach Mangosteen flavored beverage samples subjected to accelerated shelf life testing (FIG. 1A) (i.e. "Oven Sample") and the control samples stored in a refrigerator and not exposed to light (i.e. "Refrigerated Sample"). As shown, the control samples all maintained a Stability Rating of 5.

Figure 1C:
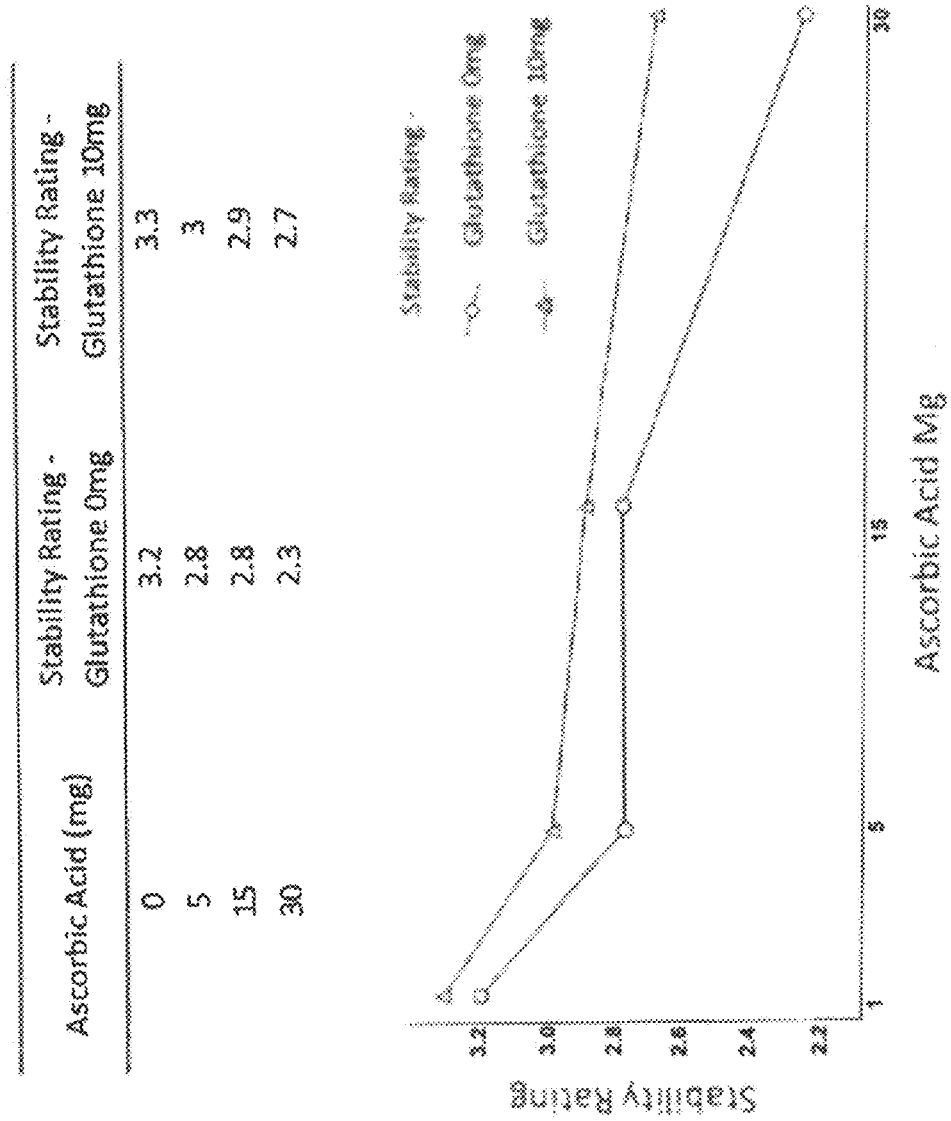
FIG. 1C depicts an exemplary graph showing 9-month stability data for a Peach Mangosteen flavored beverage with different amounts of ascorbic acid and either 0 mg or 10 mg of glutathione.

FIG. 1C shows the 9-month Stability Study for Peach Mangosteen flavored beverage. This study also shows that the glutathione containing samples were more stable than the samples which did not contain glutathione. In fact, comparing samples with 30 mg ascorbic acid, the sample with 10 mg glutathione had a Stability Rating of 2.7 while the glutathione free sample had a Stability Rating of 2.3, which is at a standard unacceptable level. At these concentrations, glutathione demonstrates the ability to preserve color and inhibit browning, yet without producing an unpleasant Sulphur taste or smell.

FIG. 1D is the 9 Month Data Table comparing the Peach Mangosteen flavored beverage samples subjected to accelerated shelf life testing (FIG. 1C) (i.e. "Oven Sample") and the control samples stored in a refrigerator and not exposed to light (I.e. "Refrigerator Sample"). As shown, all control samples maintained a Stability Rating of 5.

10 mg glutathione with 0 mg ascorbic acid in 16 oz plain water produces a noticeable unpleasant sulphur taste and smell. However, the unpleasant taste and smell is not detected in the instant beverages comprising fruit juice, glutathione and ascorbic acid. For example, if 30 mg of citric acid, 100 mg of tartaric acid or 100 mg of malic acid is added to 16 oz plain water and 10 mg glutathione, the unpleasant taste and smell of the glutathione is not detected.

The above data demonstrates that the instant beverage compositions have enhanced stability because browning and color degradation are decreased, and an undesirable sulphur smell and taste are avoided, when ascorbic acid and glutathione are added to the beverage compositions.

Example III: Second Round of Stability Studies—Experimental Testing Procedure

A base composition (35×) was made to cover all experiments without colors, ascorbic acid and glutathione. For Peach Mangosteen and Mango Cherimoya flavored beverages, the control and 10×100 gm test samples were prepared using different amounts of ascorbic acid, glutathione, and fixed amounts of beta carotene and fruit & vegetable extracts. 10 test samples were aliquoted with fruit and vegetable extracts to which ascorbic acid and glutathione were added according to the experimental protocol shown in FIG. 3A-3D. The controls were kept in the refrigerator and the remaining samples were kept in an accelerated stability chamber at 42° C. (107.6° F.). Each week small samples were taken from the refrigerated standards and the accelerated stability chamber for spectrophotometric studies.

Example III: Second Round of Stability Studies—Sample Preparation

Testing Beverage with Fruit with Different Levels of Ascorbic Acid and Glutathione.

Samples of the different beverages were prepared in triplicate, i.e. a control and 2 test samples, according to the experimental protocols depicted in FIGS. 2A-2C. All measurements were per 16 ounces. All samples contained the same ingredients for ascorbic acid and glutathione which were added according to the testing matrix shown in FIG. 2D. The control in each batch 10 was sample #1 (containing no glutathione and no ascorbic acid). Samples were hot filled in glass or plastic containers. Control samples were stored in the refrigerator whereas the test samples were placed in an accelerated stability chamber. Aliquots were taken weekly for spectrophotometric analysis.

Example IV: Second Round of Stability Studies—Experimental Procedure for Measuring Browning The purpose of this study was to determine the role glutathione has on decreasing the browning of naturally colored and green tea ready to drink (RTD) beverages with and without ascorbic acid.

The study consisted of two study groups. The 1st group (GRP 1) contained samples that were colored with fruit and vegetable extracts (see FIGS. 3A-3B; FIGS. 4A-4B). The 2nd group (GRP 2), did not contain any fruit and vegetable extracts (see FIGS. 5A-5B). Study samples were prepared in a GMP facility based on our beverage composition and sample testing matrixes. Final testing samples were hot filled and placed in accelerated stability chamber (ASC). The ASC was set to a temperature of 42° C. One week in the ASC is equivalent to about 6 weeks of the product being on retail shelves. After 3 weeks in the ASC (equivalent to 18 weeks or 4.5 months on a store shelf), the samples were taken out and placed in a refrigerator.

UV-VIS spectrophotometer is routinely used to measure browning in liquid samples in the food and beverage industry. Absorbance (ABS) correlates with the degree of browning. Thus, the higher the absorbance (ABS), the more browning is present in the sample. All the samples taken at the 3-week (ASC) timepoint were analyzed on a UV-VIS spectrophotometer. For GRP 1, a wavelength of 420 nm was used to measuring browning. A wavelength of 480 nm was used for GRP 2 to measure quinones (as described in Dai et al. J Food Sci Technol (2017) 54(9):2919-2928, the content of which is incorporated by reference herein in its entirety). The UV-VIS spectrophotometer was calibrated for each group using a refrigerated sample (standard or control: TO) before measurements were taken. All the ABS measurements were in the linear range (0.1 to 1) of the instrument.

Example IV: Second Round of Stability Studies-Test Results

As shown in FIGS. 3-5, ascorbic acid (AA) is shown to accelerate browning of beverages in Groups 1 and 2, i.e. in beverages with or without fruit and vegetable extracts.

Figures 3A, 3B:
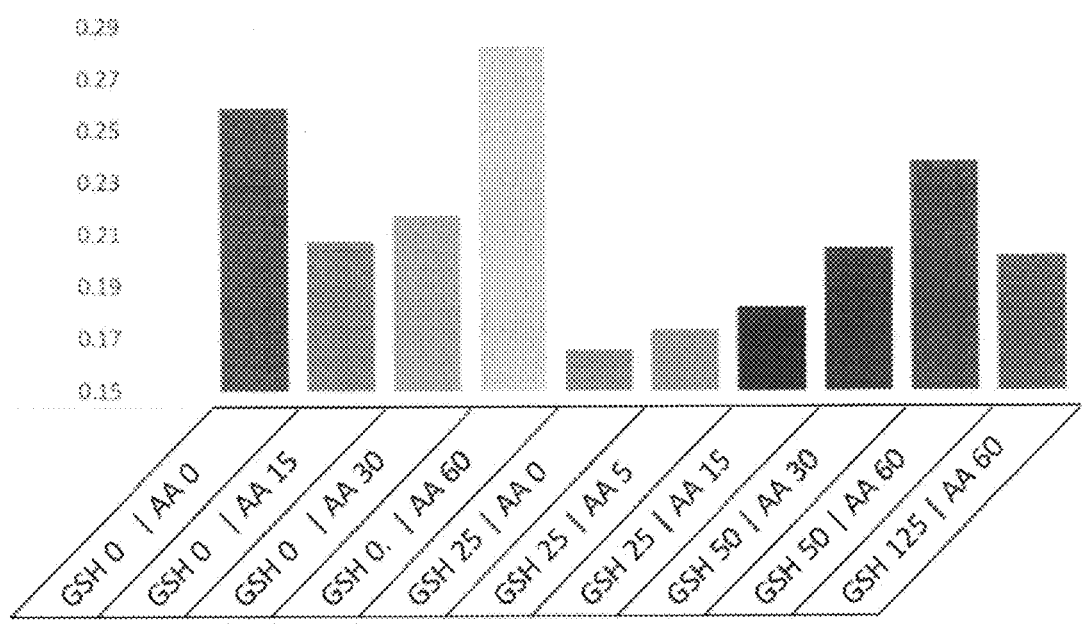
FIG. 3A shows the 420 nm absorption measurements of a Peach Mangosteen flavored beverage of FIG. 2A in the presence of different amounts of ascorbic acid and glutathione presented in the form of a table.
FIG. 3B shows the 420 nm absorption measurements of a Peach Mangosteen flavored beverage of FIG. 2A in the presence of different amounts of ascorbic acid and glutathione presented in the form of a graph.
Figures 4A, 4B:
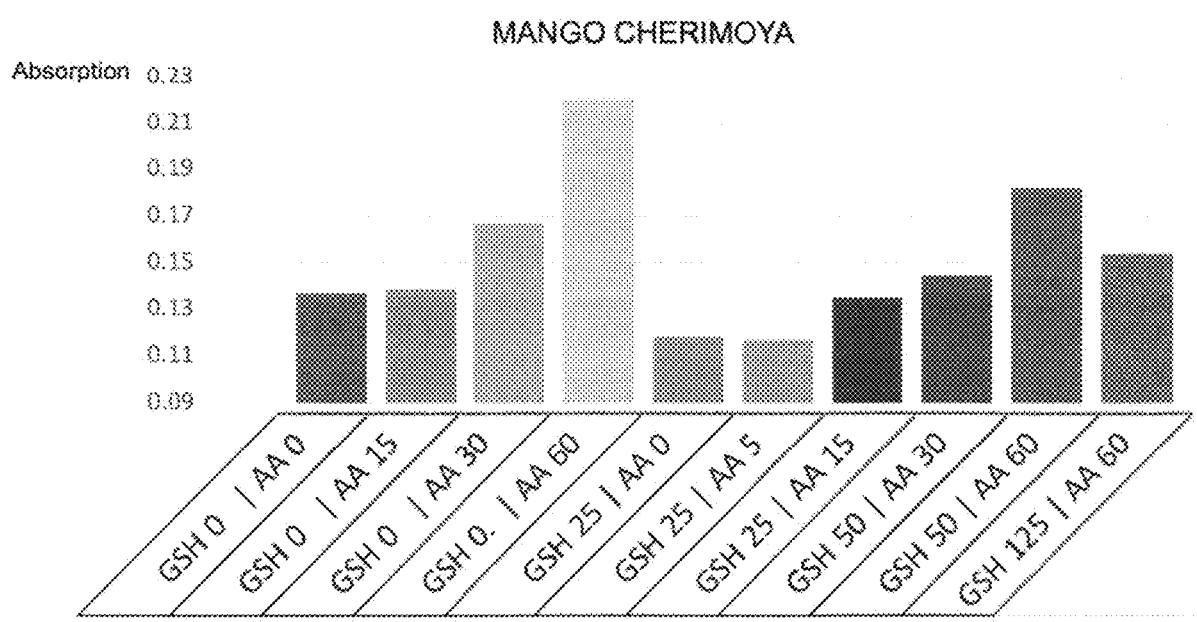
FIG. 4A shows the 420 nm absorption measurements of a Mango Cherimoya flavored beverage of FIG. 2B in the presence of different amounts of ascorbic acid and glutathione presented in the form of a table.
FIG. 4B shows the 420 nm absorption measurements of a Mango Cherimoya flavored beverage of FIG. 2B in the presence of different amounts of ascorbic acid and glutathione presented in the form of a graph.

Analysis of the Peach Mangosteen flavored beverage data in FIGS. 3A-3B shows:
Comparing sample 1 which contains neither ascorbic acid (AA) nor glutathione (GSH), and sample 4 which contains 0.00072M (172 μM) of AA demonstrates that AA increased browning by 9% in the absence of added glutathione (GSH).
Comparing sample 1 which contains neither AA nor GSH, and sample 5 which contains 0.000172M (172 μM) of GSH, browning decreased by 36%. Hence, GSH preserved the color and reduced browning.
Comparing sample 1 which contains neither AA nor GSH, and sample 6 which contains 0.00006M (60 μM) of AA and 0.000172M (172 μM) of GSH, browning decreased by 33%. Hence, 60 μM GSH preserved the color and reduced browning when AA was at a concentration of 0.000172M (172 μM).
Comparing sample 2 which contains 0.00018M (180 μM) of AA/no GSH, and sample 7 which contains 0.00018M (180 μM) of AA and 0.000172M (172 μM) GSH, browning decreased by 12.5%. Hence, 0.000172M (172 μM) GSH preserved the color and reduced browning when AA was at a concentration of 00.00018M (180 μM).
Comparing sample 3 which contains 0.00036M (360 μM) of AA/no GSH, and sample 8 which contains 0.00018M (180 μM) of AA and 0.000344M (344 μM) GSH, browning decreased by 6% in browning. Hence, 0.000344M (344 μM) GSH preserved the color and reduced browning when AA was at a concentration of 0.00018M (180 μM).
Comparing sample 4 which contains 0.00072M (720 μM) of AA/no GSH, and sample 9 which contains 0.00072M (720 μM) of AA and 0.000344M (344 μM) GSH, browning decreased by 16%. Hence, 0.000344M (344 μM) GSH preserved the color and reduced browning when AA was at a concentration of 0.00072M (720 μM).
Comparing sample 4 which contains 0.00072M (720 μM) of AA/no GSH, and sample 10 which contains 0.00072M (720 μM) of AA and 0.00086 (860 μM) GSH, browning decreased by 29%. Hence, 0.00086 (860 μM) GSH preserved the color and reduced browning when AA was at a concentration of 0.00072M (720 μM).

Analysis of the Mango Cherimoya flavored beverage data in FIGS. 4A-4B shows:
Comparing sample 1 which contains neither AA nor GSH, and sample 4 which contains 0.00072M (720 μM) of AA, browning increased by 62%. Thus, AA increased browning.
Comparing sample 1 which contains neither AA or GSH, and sample 5 which contains 0.000172M (172 μM) of GSH demonstrated GSH preserved color and reduced browning by 14%.
Comparing sample 1 which contains neither AA nor GSH, and sample 6 which contains 0.00006M (60 μM) of AA and 0.000172M (172 μM) of GSH, browning decreased by 14%. Hence, 0.000172M (172 μM) GSH preserved the color and reduced browning when AA was at a concentration of 0.00006M (60 μM).
Comparing sample 2 which contains 0.00018M (180 μM) of AA/no GSH, and sample 7 which contains 0.00018M (180 μM) of AA and 0.000172M (172 μM) GSH, browning decreased by 1%. Hence, 0.000172M (172 μM) GSH did not significantly preserve the color or reduce browning when AA was at a concentration of 0.00018M (180 μM).
Comparing sample 3 which contains 0.00036M (360 μM) of AA/no GSH, and sample 8 which contains 0.00018M (180 μM) of AA and 0.000344M (344 μM) GSH, browning decreased by 13%. Hence, 0.000344M (344 μM) GSH preserved the color and reduced browning when AA was at a concentration of 0.00018M (180 μM).
Comparing sample 4 which contains 0.00072M (720 μM) of AA/no GSH, and sample 9 which contains 0.00072M (720 μM) of AA and 0.000344M (344 μM)

GSH, browning decreased by 17%. Hence, 0.000344M (344 µM) GSH preserved the color and reduced browning when AA was at a concentration of 0.00072M (720 µM).

Comparing sample 4 which contains 0.00072M (720 µM) of AA/no GSH, and sample 10 which contains 0.00072M (720 µM) of AA and 0.000860M (860 µM) GSH, browning decreased by 30%. Hence, 0.000860M (860 µM) GSH preserved the color and reduced browning when AA was at a concentration of 0.00072M (720 µM).

Figures 5A, 5B:
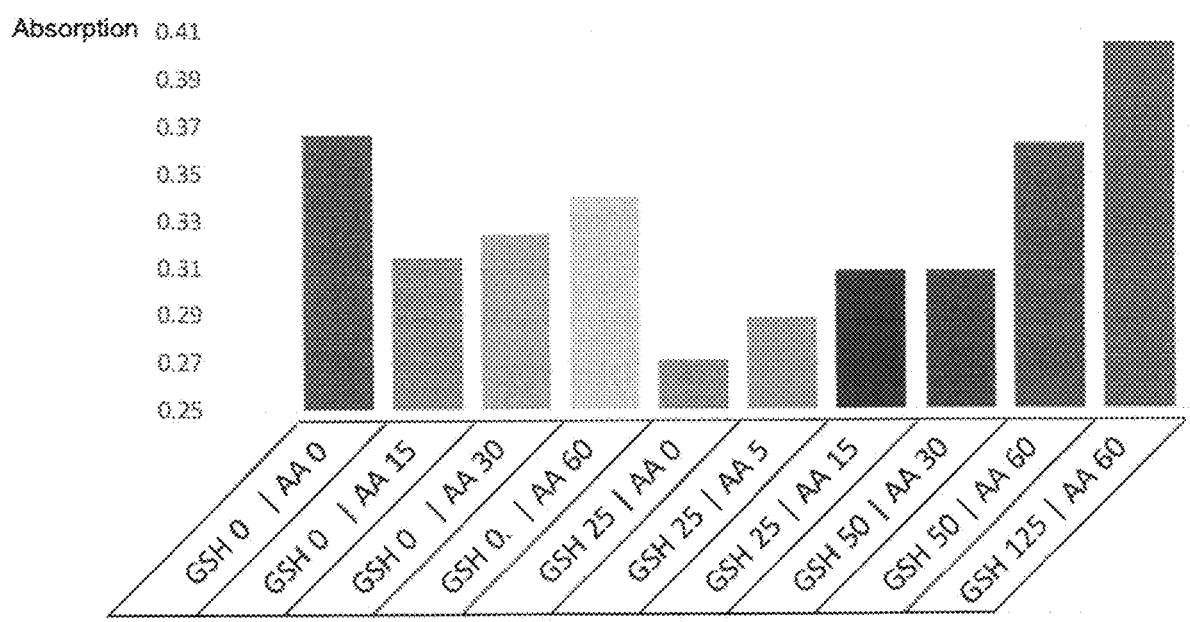
FIG. 5A shows the 480 nm absorption measurements of a Mango Cherimoya beverage without a natural colorant from fruit and/or vegetable extracts of FIG. 2C (Green Tea Study) in the presence of different amounts of ascorbic acid and glutathione presented in the form of a table.
FIG. 5B shows the 480 nm absorption measurements of a Mango Cherimoya beverage without a natural colorant from fruit and/or vegetable extracts of FIG. 2C (Green Tea Study) in the presence of different amounts of ascorbic acid and glutathione presented in the form of a graph.

Analysis of the No Fruit or Vegetable color data in FIGS. 5A-5B shows:

Comparing sample 1 which contains neither AA or GSH, and sample 4 which contains 0.00072M (720 µM) of AA, browning decreased by 7%. Thus, AA decreased browning.

Comparing sample 1 which contains neither AA or GSH, and sample 5 which contains 0.000172M (720 µM) of GSH, browning decreased by 26%. Hence, 0.000172M (720 µM) of GSH preserved the color and reduced browning of the sample.

Comparing sample 1 which contains neither AA or GSH, and sample 6 which contains 0.00006M (60 µM) of AA and 0.000172M (720 µM) of GSH, browning decreased by 21%. Thus, 0.000172M (720 µM) GSH preserved the color and reduced browning when AA was at a concentration of 0.00006M (60 µM).

Comparing sample 2 which contains 0.00018M (180 µM) of AA/no GSH, and sample 7 which contains 0.00018M (180 µM) of AA and 0.000172M (720 µM) GSH, browning decreased by 2%. Thus, 0.000172M (720 µM) GSH I did not significantly preserve the color or reduce browning when AA was at a concentration of 0.00018M (180 µM).

Comparing sample 3 which contains 0.00036M (360 µM) of AA/no GSH, and sample 8 which contains 0.00018M (180 µM) of AA and 0.000344M (344 µM) GSH, browning decreased by 5%. Thus, 0.000344M (344 µM) GSH preserved the color and reduced browning when AA was at a concentration of 0.00018M (180 µM).

Comparing sample 4 which contains 0.00072M (720 µM) of AA/no GSH, and sample 9 which contains 0.00072M (720 µM). of AA and 0.000344M (344 µM) GSH, browning increased by 6%. Thus, 0.000344M (344 µM) GSH did not preserve the color or reduce browning when AA was at a concentration of 0.00072M (720 µM).

Comparing sample 4 which contains 0.00072 M (720 µM) of AA/no GSH, and sample 10 which contains 0.00072M (720 µM) of AA and 0.00086 M (860 µM) GSH, browning increased by 19%. Thus, 0.00086 M (860 µM) GSH did not preserve the color or reduce browning when AA was at a concentration 0.00072M (720 µM). On the contrary, GSH at a concentration of 0.00086 M (860 µM) accelerated browning.

In conclusion, in beverages not containing a fruit juice composition or a natural colorant from fruit and/or vegetable extracts, low concentrations of 150-350 µM (0.005%-0.01% w/w) glutathione significantly reduced browning as compared to the control which contained noascorbic acid or glutathione. The data also showed that when a lower concentration of glutathione is used with ascorbic acid, the browning effect was also reduced.

Example V: Tasting Study

Glutathione contains a sulfide group which contributes to a smell of rotten eggs and an unpleasant taste of sulphur when it is dissolved in aqueous solution. To evaluate if the presence of citric acid could attenuate or eliminate this smell and/or taste of sulfur, a series of solutions containing from 10-125 mg of glutathione with or 625 mg citric acid were dissolved in 16 ounces of water, as follows:

Group I consisted of I 0 mg of GSH dissolved in 16 ounces of plain filtered water.

Group 2 consisted of 25 mg of GSH dissolved in 16 ounces of plain filtered water.

Group 3 consisted of 125 mg of GSH dissolved in 16 ounces of plain filtered water.

Group IA consisted of 10 mg of GSH and 625 mg of citric acid dissolved in 16 ounces of plain filtered water.

Group 2A consisted of 25 mg of GSH and 625 mg of citric acid dissolved in 16 ounces of plain filtered water.

Group 3A consisted of 125 mg of GSH and 625 mg of citric acid dissolved in 16 ounces of plain filtered water.

In a blind study, six volunteers were asked to taste each group and rate the taste (Sulphur) and smell (Sulphur) on a scale from I to 5. With a rating of 1 being undetectable and a rating of 5 being highly detectable.

As shown in FIG. 6, the presence of citric acid eliminated or greatly reduced the smell and taste of sulfur in all glutathione solutions tested. In solutions containing I 0 mg glutathione, the presence of citric acid completely eliminated any smell or taste of Sulphur.

What is claimed is:

1. A beverage composition having enhanced stability and preserved color, comprising:
    a plant-based composition comprising about 2% (v/v) or less of a juice-based composition;
    a natural colorant from fruit and/or vegetables; and
    a concentration of glutathione effective at reducing browning of the beverage composition,
    wherein the beverage composition has a pH equal to or less than about 4;
    wherein the beverage composition contains no alcohol.

2. The beverage composition of claim 1, wherein the concentration of glutathione effective at reducing browning is about 65-860 µM.

3. The beverage composition of claim 1, wherein the concentration of glutathione effective at reducing browning is about 150 µM.

4. The beverage composition of claim 1, wherein the concentration of glutathione effective at reducing browning is about 350M.

5. The beverage composition of claim 1, wherein the browning is acid-induced.

6. The beverage composition of claim 1, wherein the beverage composition does not smell or taste of sulfur.

7. The beverage composition of claim 1, further comprising an edible acid.

8. The beverage composition of claim 7, wherein the edible acid comprises at least one of citric acid, malic acid, tartaric acid and ascorbic acid.

9. The beverage composition of claim 7, wherein the edible acid accelerates browning of the beverage composition when the beverage composition does not contain glutathione.

10. The beverage composition of claim 7, wherein the edible acid is ascorbic acid.

11. The beverage composition of claim 1, wherein the glutathione is effective at reducing the browning and preserving the color of the beverage composition for at least 3-9 months.

12. The beverage composition of claim 1, wherein the plant-based composition comprises a Mango Cherimoya, Coconut Jackfruit, Tangerine Prickly Pear and/or Peach Mangosteen flavor.

13. The beverage composition of claim 1, wherein the plant-based composition further comprises at least one of a green tea extract; a plant-based sugar free sweeteners; a sugar-based sweetener; a plant-based flavor, and/or a plant-based micronutrient.

14. The beverage composition of claim 1, wherein the beverage composition further comprises at least one of caffeine from natural sources, a vitamin, and electrolytes.

15. A beverage composition having enhanced stability, comprising:
   a plant-based composition comprising a green tea extract;
   an edible acid;
   a concentration of glutathione effective at reducing browning of the beverage composition, wherein the beverage composition does not contain a colorant, and
   wherein the beverage composition has a pH equal to or less than about 4;
   wherein the beverage composition contains no alcohol.

16. The beverage composition of claim 15, wherein the plant-based composition further comprises about 2% (v/v) or less of a fruit juice composition.

17. The beverage composition of claim 15, wherein the edible acid comprises citric acid, malic acid, tartaric acid, ascorbic acid or any combination thereof.

18. The beverage composition of claim 15, wherein the concentration of glutathione effective at reducing browning is about 150-350 µM.

19. The beverage composition of claim 15, wherein the concentration of glutathione effective at reducing browning is less than about 150 µM.

20. A beverage composition having enhanced stability and preserved color, consisting of:
   a plant-based composition;
   an edible acid;
   at least one of sweeteners, a colorant, a flavor and/or caffeine; and
   glutathione,
      wherein the glutathione is in a concentration effective at reducing browning of the beverage composition for at least about 3-9 months; and
   wherein the beverage composition contains no alcohol.

* * * * *